(No Model.)
W. L. STALONS & L. A. GILLETT.
CHEESE SCALE.
No. 583,695. Patented June 1, 1897.
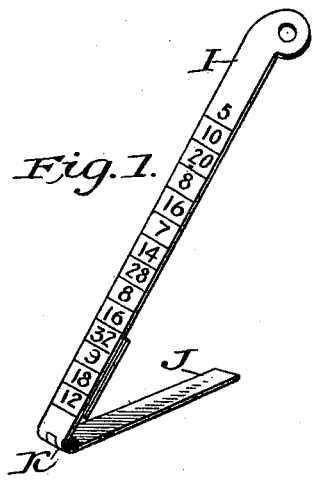
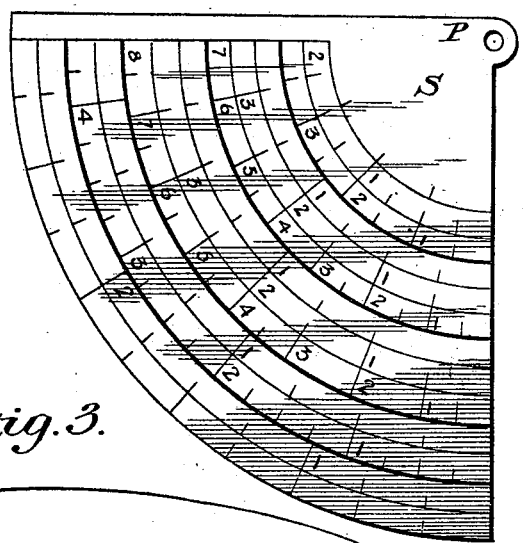
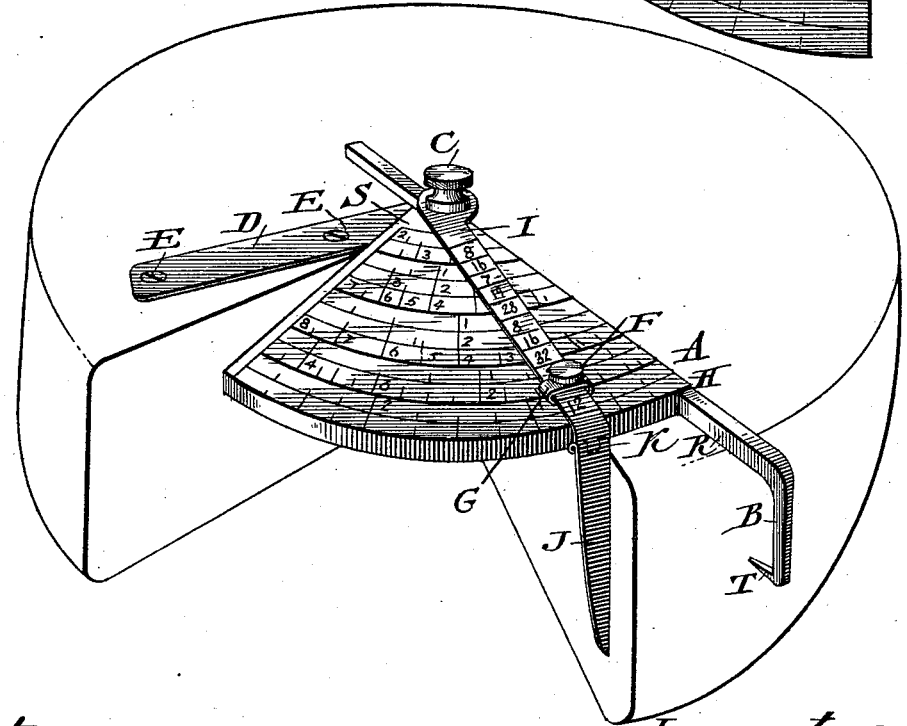
Witnesses.
O. Lofgren
Miss L. Gillett
Inventor.
Will L. Stalons
Lester A. Gillett

United States Patent Office.

WILLIAM L. STALONS AND LESTER A. GILLETT, OF WALSBURG, KANSAS.

CHEESE-SCALE.

SPECIFICATION forming part of Letters Patent No. 583,695, dated June 1, 1897.

Application filed May 8, 1896. Serial No. 590,798. (No model.)

*To all whom it may concern:*

Be it known that we, WILLIAM L. STALONS and LESTER A. GILLETT, of Walsburg, in the county of Riley and State of Kansas, have invented a new and useful Improvement in Cheese-Scales, which improvement is fully set forth in the following specification, reference being had to the accompanying drawings.

Our invention relates to improvements in cheese scales or gages used to determine the weight of a part of a cheese before cutting.

The object of our improvement is to supply a cheese-scale that will be simple of construction, compact of form, and very easy to operate. We attain this object by the mechanism illustrated in the accompanying drawings, in which—

Figure 3 is a perspective view of the entire machine. Fig. 2 is a plan of the sector, showing the graduated scale, &c. Fig. 1 is a view of the indicator, showing the way it is made and numbered to correspond with scale on the sector.

Similar letters refer to similar parts throughout the several views.

The scale consists of the sector S, which may be made to represent any desired part of a circle, but which in this case we have made the one-fourth of a circle, since we consider that size most convenient. Upon the right side A of the sector S we have formed a square tube or groove H, into which we have fitted a square rod R in such a manner that it may be freely moved back and forth lengthwise, but cannot be turned in the tube or groove. The rod R is bent so as to pass down over the side of the cheese, as at B, with a short tooth or projection at its lower end, which is forced into the cheese after the proper measurement has been taken. The rod is thus held in position while the operator is cutting the cheese, the rod R thus forming a straight-edge or guide for the knife. The sector S is perforated at P, and the plate D is pivotally connected to the under side and the indicator I to the upper side of the sector S by means of the thumb-screw C, which passes through the indicator I, sector S, and plate D, thus holding all firmly together, while at the same time allowing them to vibrate back and forth horizontally. The plate D is provided with pins or screws E E, which are forced into the cheese after the scale has been so adjusted as to bring the thumb-screw C directly over the center of the cheese, thus holding the scale in position.

The indicator I is provided with a clamp G, which may be pushed back and forth on the indicator I and fastened at any desired point by tightening the set-screw F. It will be seen by referring to Fig. 1 that the indicator I is numbered to correspond to the weight of different-sized cheeses, the sector S being graduated to correspond to those weights. The object of using a numbered indicator is to obviate the necessity of having a separate sector for each size cheese. If a cheese weighs eight pounds, it is readily seen that one-eighth of it cut from its center to circumference must weigh one pound, one-fourth two pounds, one-half four pounds, and so on. Therefore we divide the sector into as many equal divisions as are necessary to represent pounds, quarters, and half-pounds, each scale of divisions being marked in a circle on the sector one above the other and the indicator I numbered to correspond to the circles, the operator setting the clamp G to indicate what scale of weights he is using, thus avoiding the danger of confusion or mistakes.

The indicator I is made in two parts and fastened together by the hinge K. This is done to make the device more convenient for shipment and to permit the end J to be placed horizontally before the cheese has first been cut or when the operator desires to cut a larger piece than can be measured by one width of the sector S.

The operation is as follows: After ascertaining the weight of a whole cheese by weighing it on an ordinary scale the cheese-scale is placed on top of the cheese with the thumb-screw C directly over the center of the cheese. The pins E E are then pressed into the cheese to hold the scale in place. A line is then drawn from the center of the cheese to its circumference as a starting-point. The right edge of the indicator I is then placed over the line thus drawn, and the operator, taking hold of the rod R, pushes it around to right until the division on the scale that corresponds to the desired number of pounds he wishes to cut off is directly under the right edge of the indicator I, when he presses the sharp point T into the cheese and proceeds to cut along the right edge of the scale at A and then along the line first marked. After the first piece is cut the indicator I is placed against the cut surface of the cheese, as shown at Fig. 3.

The indicator I is supplied with an index, which consists of a series of numbers placed upon the indicator in such a manner as to bring each number directly over the circle on the sector S, that is graduated for the weight that corresponds with that number—that is, if a circle on the sector S is graduated for a ten-pound cheese the figure "10" will be placed on the indicator I just above that circle, and so on for the different weights, the indicator being supplied with a movable pointer that can be set so as to indicate the size of cheese that is being cut, and the graduated circle on the sector, that should be used to measure it. If preferred, the index could be printed upon the sector S instead of upon the indicator, and the pointer on the indicator I used in the same way as described above, and the result would be the same.

Having thus described our invention, what we claim as new, and desire to secure by Letters Patent, is—

1. In a cheese-scale the combination of a graduated sector one edge of which is provided with a straight-edge or guide which may be adjustable or otherwise, a pivotally-connected rod or plate for attaching scale to cheese and a pivotally-connected indicator or guide substantially as set forth.

2. A sector having a series of graduated concentric circles with a pivotally-connected indexed guide provided with a movable pointer, and a pivotally-connected rod or plate provided with means for attaching scale to cheese substantially as set forth and for the purpose specified.

WILLIAM L. STALONS.
LESTER A. GILLETT.

Witnesses:
LAURA A. GILLETTE,
OSCAR LOFGREN.